May 3, 1955  H. O. TROTTER ET AL  2,707,577
RECORDER ACTUATED VEHICULAR BRAKE CONTROL MEANS
Original Filed May 10, 1952  9 Sheets-Sheet 1

HOBART O. TROTTER,
MARVIN L. TROTTER
and CECIL WAYNE JARVIS,
INVENTORS

BY *Eaton & Bell*

ATTORNEYS

HOBART O. TROTTER,
MARVIN L. TROTTER
and CECIL WAYNE JARVIS,
INVENTORS

BY *Eaton + Bell*

ATTORNEYS

HOBART O. TROTTER,
MARVIN L. TROTTER
and CECIL WAYNE JARVIS,
INVENTORS.

BY Eaton & Bell

ATTORNEYS

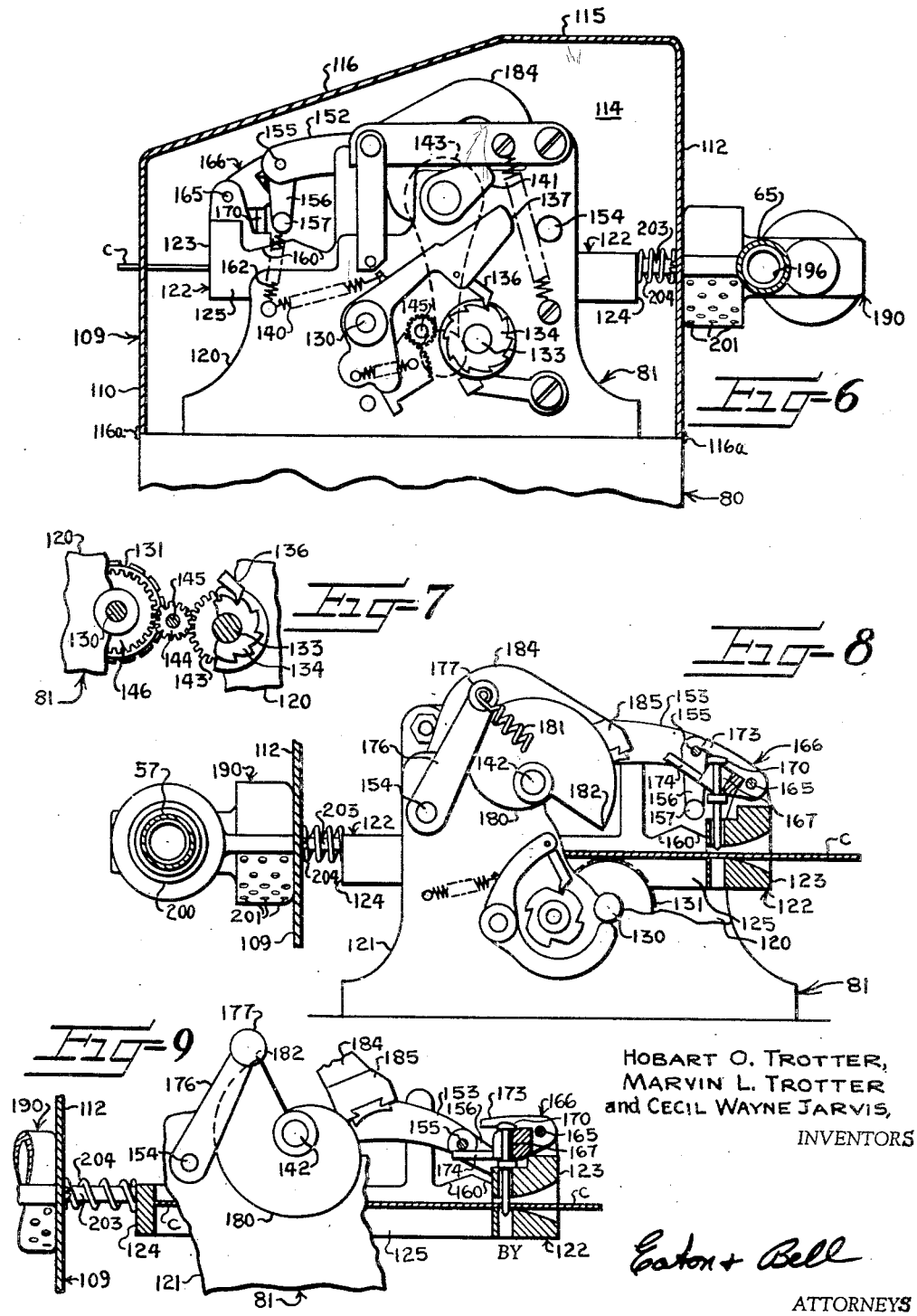

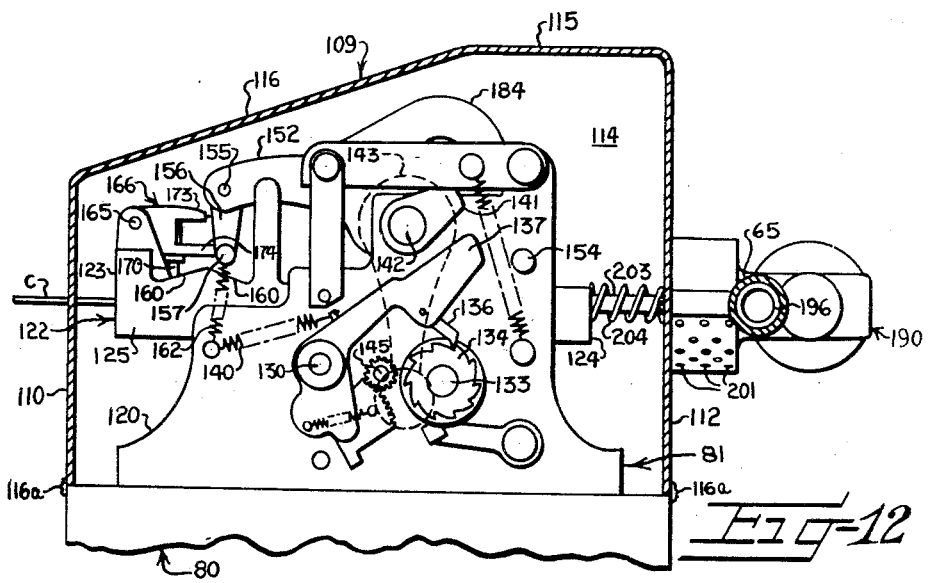
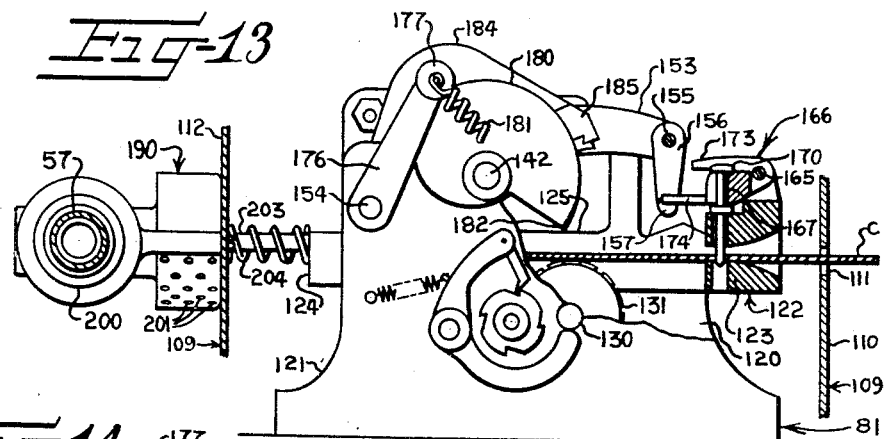
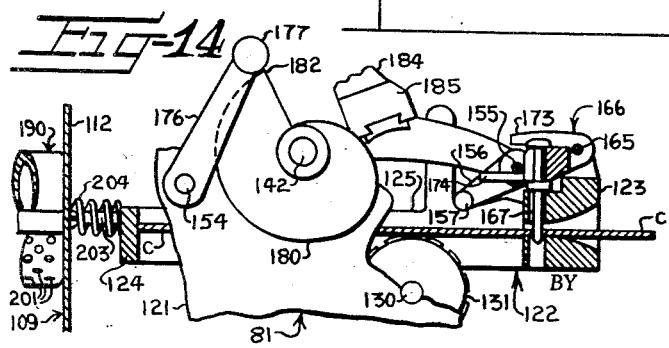

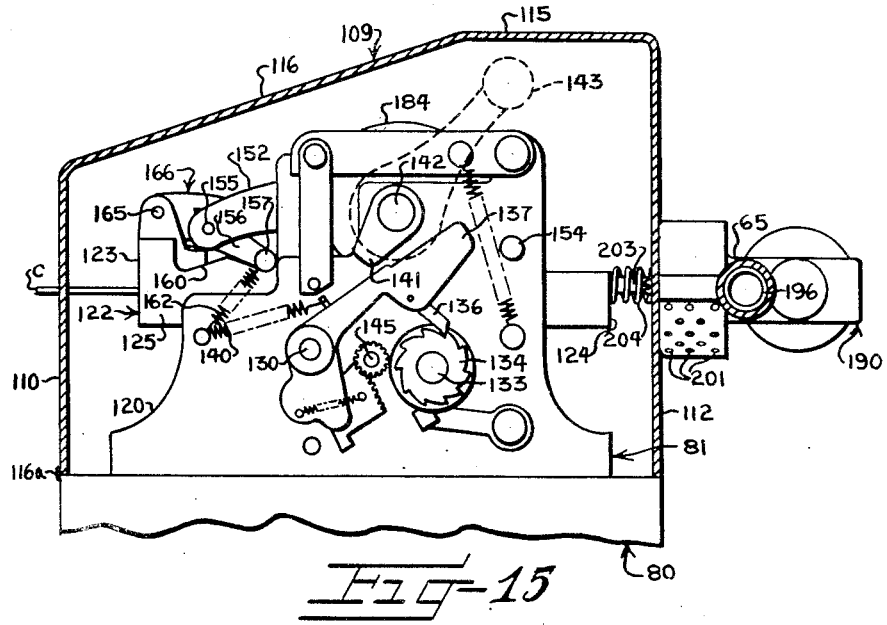

May 3, 1955 H. O. TROTTER ET AL 2,707,577
RECORDER ACTUATED VEHICULAR BRAKE CONTROL MEANS
Original Filed May 10, 1952 9 Sheets-Sheet 8
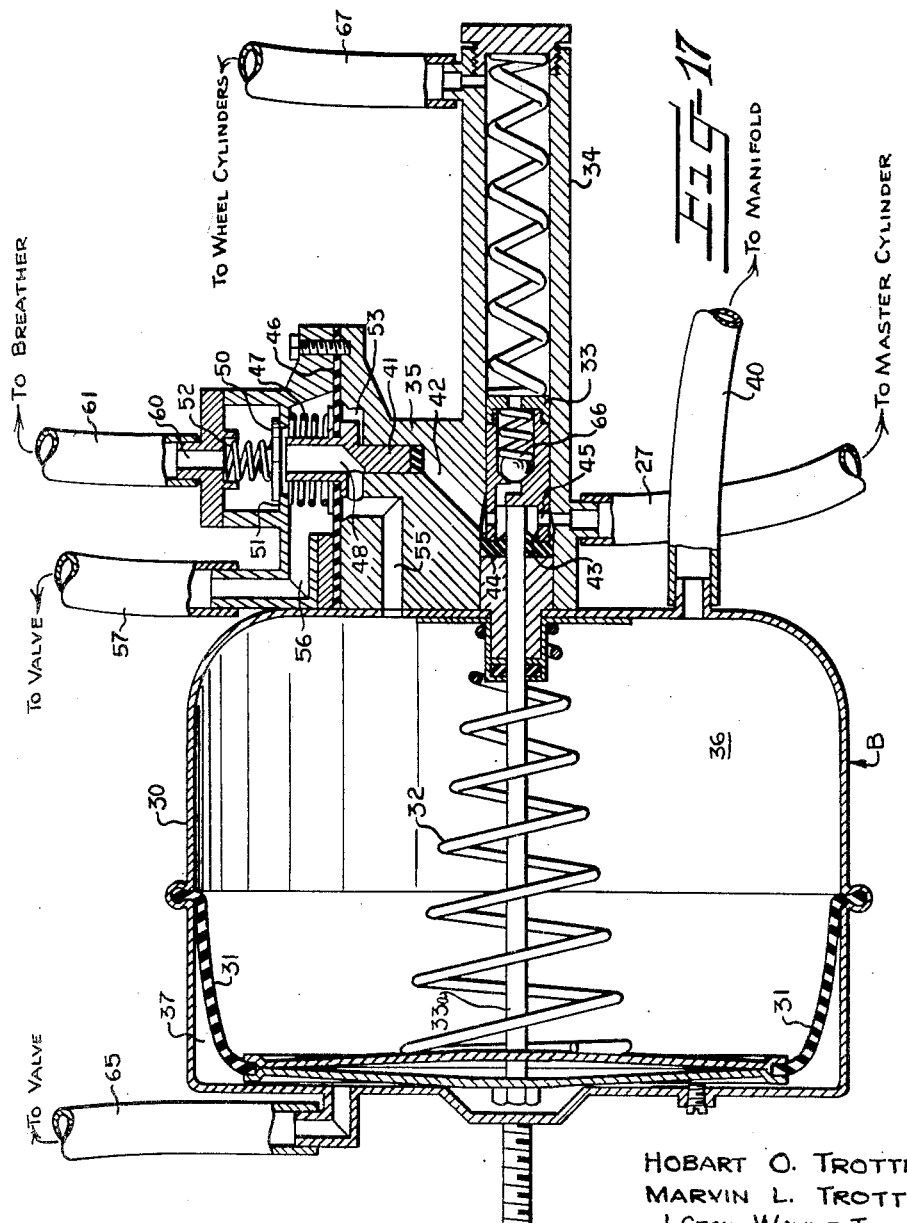
HOBART O. TROTTER,
MARVIN L. TROTTER
and CECIL WAYNE JARVIS,
INVENTORS.
BY  *Eaton & Bell*
ATTORNEYS

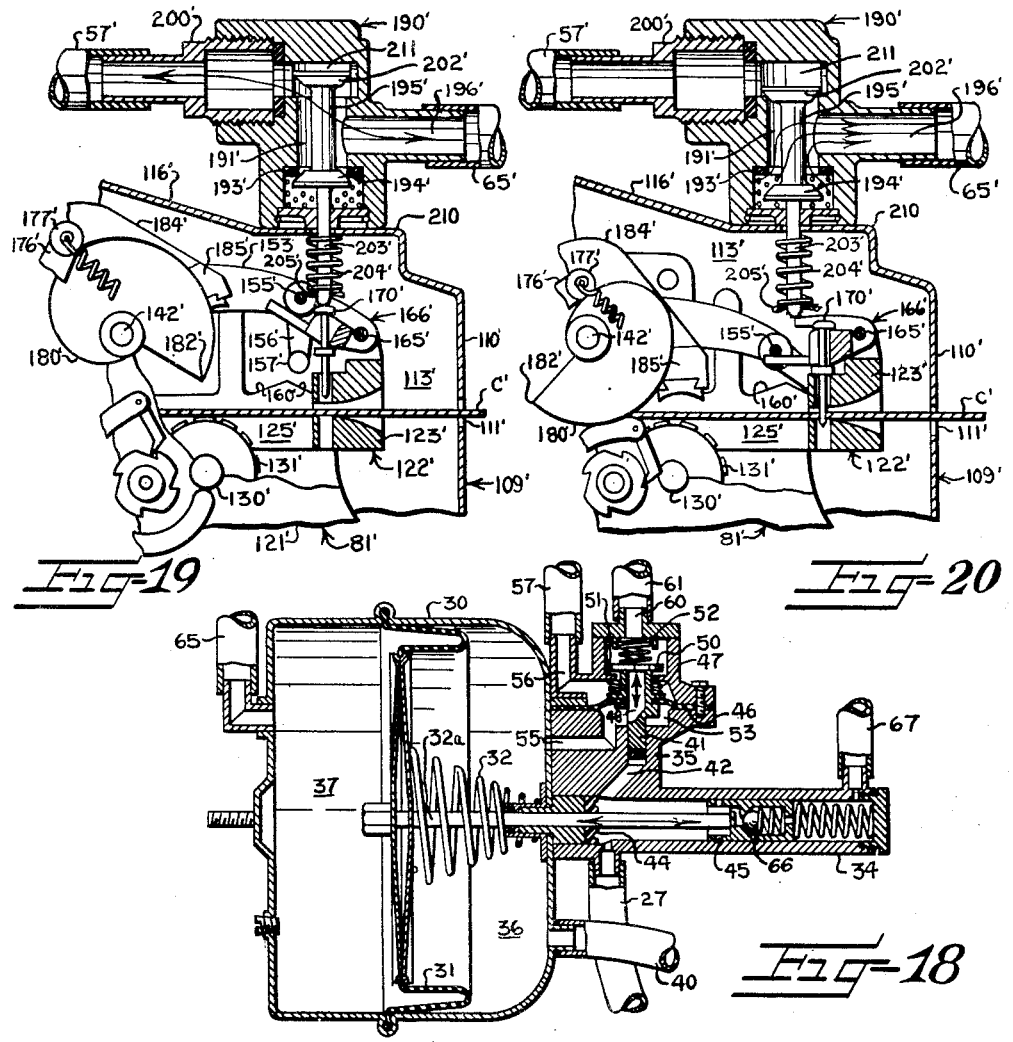

500
United States Patent Office 2,707,577
Patented May 3, 1955

2,707,577

RECORDER ACTUATED VEHICULAR BRAKE CONTROL MEANS

Hobart O. Trotter, Marvin L. Trotter, and Cecil Wayne Jarvis, Columbia, S. C.

Continuation of abandoned application Serial No. 287,228, May 10, 1952. This application August 11, 1952, Serial No. 303,643

7 Claims. (Cl. 222—30)

This invention appertains, in particular, to meter recording devices for fuel-oil or gas dispensing trucks wherein the meter recording device is operated manually to imprint on a saleslip the quantity of oil dispensed, together with the serial number of the saleslip, and the primary object of the invention is to provide means for automatically locking the brakes of the truck or other vehicle, with which the meter recording device is associated, during the interim from the time at which the saleslip is initially inserted in the meter recording device, during dispensation of fuel-oil or other fluid or gas from the individual truck or vehicle, and until the saleslip is again serially numbered or otherwise marked and released from the meter recording device.

Such a brake actuating means is not only valuable from a standpoint of safety, but, primarily, such a brake actuating means precludes the truck driver from cheating his employer's customer by short delivery and selling for his own profit the quantity of fuel-oil he has cheated him out of.

This application is a continuation of our co-pending application, Serial No. 287,228, filed May 10, 1952 and entitled Recorder Actuated Vehicular Brake Control Means and Method, now abandoned.

Some of the objects of the invention having been stated, other objects will appear as the description proceeds, when taken in connection with the accompanying drawings, in which—

Figure 6 is an elevation looking at the right-hand side of the recording printing mechanism of the meter recording device shown in Figure 3, showing the housing or cover therefor in cross-section and showing the carriage in normal position for maintaining the brake operating valve in closed position;

Figure 7 is a fragmentary elevation of the lower central portion of Figure 6 with parts broken away to illustrate the connections for intermittently driving the serial number printing wheels;

Figure 8 is a view looking at the opposite side of the recording printing mechanism from that shown in Figure 6, but with parts broken away and other parts being in cross-section;

Figure 9 is somewhat a schematic view showing the carriage in a different position from that shown in Figure 8 and in which position the brake operating valve is open and the brakes of the vehicle are locked;

Figure 12 is view similar to Figure 10, but showing the thrust arms and the manually operative crank handle in another position;

Figure 13 is a view similar to Figure 11, but showing the movable parts of the recording printing mechanism in positions corresponding to Figure 12;

Figure 14 is a view similar to Figure 9, but showing the carriage in valve closing position and also showing the thrust arms in a different position from that shown in Figure 9;

Figure 2:
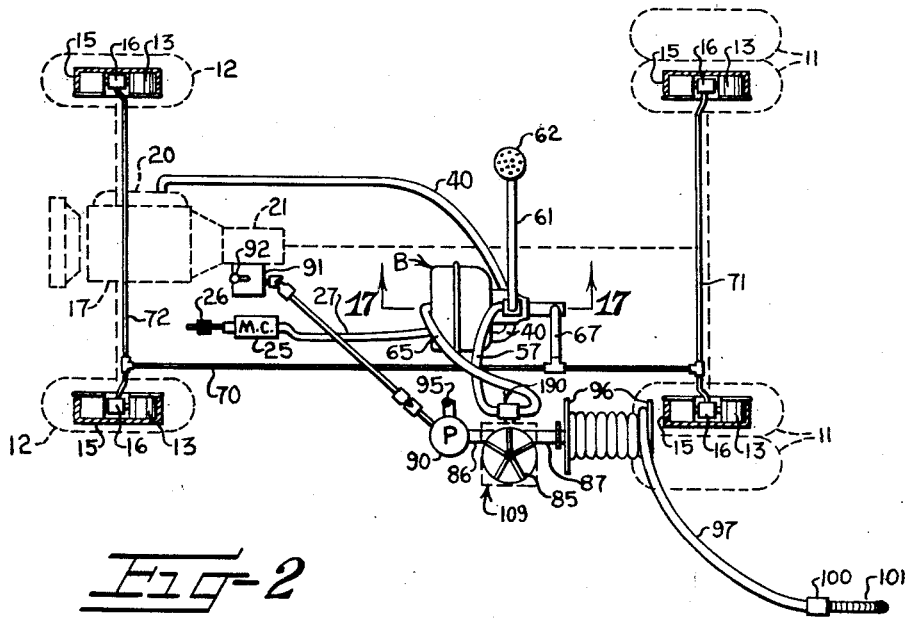
Figure 2 is a schematic plan view showing the fuel dispensing mechanism, with parts thereof being shown diagrammatically, and showing the wheels and engine of the truck associated therewith in broken lines.

Figures 15 and 16 are views similar to the respective Figures 12 and 13, but showing the movable parts of the recorder in still another position as a result of turning the manually operative crank handle from the position shown in Figure 12 in a clockwise direction for approximately 130°;

Figure 17 is a longitudinal vertical sectional view through the brake booster assembly taken substantially along the line 17—17 in Figure 2 and also showing the diaphragm in the position it occupies when the brakes of the associated vehicle are released;

Figure 18 is a view similar to Figure 17, but being at a reduced scale, showing the diaphragm in the position it occupies when the brakes of the vehicle are actuated or locked;

Figure 19 is a fragmentary vertical sectional view with parts broken away and wherein only the front portion of the recorder is shown and wherein the recorder controlled brake operating valve is located in a different position from that shown in Figures 3, 6, and 8 to 16, inclusive, and also wherein the plunger of the valve is operated by the saleslip locking pin instead of the carriage;

Figure 20 is a view similar to Figure 19, but showing the saleslip locking pin and associated parts in a different position from that shown in Figure 19;

Figure 21 is another view similar to Figure 19 wherein the locking pin and associated parts are shown in still another position.

General synopsis of invention

Generally, the present invention is embodied in a vehicular brake actuating means B in combination with a meter recording mechanism 80, 81, 109 substantially of the type disclosed in the patent to C. L. McMullen, No. 2,086,363 of July 6, 1937. In said patent, there is disclosed a meter recording mechanism wherein a saleslip C or the like is inserted in the meter, whereupon a crank handle 143 is rotated sufficiently to register the serial number and the present reading on the meter on the saleslip C while simultaneously gripping the saleslip in the recording device 81 to prevent removal of the saleslip.

Now, this type of meter recording device, disclosed in said patent, has a carriage 122 which reciprocates in timed relation to movement of the recording apparatus as it is actuated by the operator and, in the preferred embodiment of the invention, we provide a suitable valve 190 mounted on the housing 109 of the recording portion 81 of the meter recording device. The plunger 203 of valve 190 is engageable, at times, by the carriage 122. The valve mechanism may be of any desired construction and is preferably of the type disclosed in the patent to R. C. Russell, Serial Number 2,329,087 of September 7, 1943, but with the ball check and spring removed.

Most fuel-oil trucks are provided with booster operated hydraulic or air brakes. Such trucks or other vehicles are provided with a booster B having a diaphragm therein which is controlled by vacuum pressure usually from the internal combustion engine 17 of the vehicle. Now, we have connected conduits or pipes 57, 65 to opposite sides of the valve 190 and the other ends of these pipes are connected to the booster B for communication with chambers 36, 37 on opposite sides of the diaphragm 31 in the booster.

With said plunger 203 held in one position by said carriage 122 of the recording printing mechanism 81 of the meter recording device, negative pressure is normally present in both conduits 57, 65 to which the valve 190 is connected. On the other hand, upon the plunger 203 being moved to another position, when released by said carriage, this permits atmosphere to enter the pipe 65 from the valve 190, thus rendering the vacuum pressure inoperable, as will be later described in detail, for maintaining the brakes of the truck or other vehicle in a released state, and thereby tightly locking the brakes. It so happens that the carriage 122, which is of the type used in the recording mechanism disclosed in said McMullen patent, occupies a certain position from the time at which said numerals or other information is initially recorded on the saleslip by the recording printing mechanism, during the dispensation of fuel-oil or the like from the individual truck, and until the recording device is again actuated to record the amount of fuel-oil or the like dispensed. Whenever the recording device is actuated as last described, another serial number is recorded while simultaneously releasing the saleslip from the recording printing mechanism 81 of the meter recording device.

Thus, it is impossible for the truck driver to move the truck or other vehicle during the time between the first and second actuations of the printing mechanism 81, whereas, heretofore, the operator has been able to make a short delivery to the employer's customer without removing the saleslip from the recording printing mechanism of the meter recording device and to then move the truck or other vehicle to another point and sell, for his own profit, the quantity of fuel-oil he has cheated his employer's customer out of, whereupon he could then actuate the recording printing mechanism to record the serial number and the amount of fluid dispensed, and said employer's customer would, of course, have to pay for the entire amount of fuel-oil or the like dispensed until the recording printing mechanism was again actuated.

There are various ways in which the meter controlled brake operating valve may be actuated by the meter and, in another form of the invention (Figures 19, 20 and 21), the resiliently biased plunger 203' of the valve 190' is normally held in closed position by a locking pin 170' while the locking pin is in inactive position and which locking pin moves relative to said carriage to penetrate and lock the saleslip C' in the carriage 122' immediately before the serial number or other information is initially recorded on the saleslip by the recording mechanism and, in so doing, the locking pin 122' releases the plunger 203' to permit the same to move to another position, in which position the plunger permits atmosphere to enter one side of the diaphragm housing of said brake booster B to thus lock the brakes of the truck or other vehicle with which the meter is associated. Of course, when the desired amount of fuel-oil or the like has been dispensed and the carriage 122' is again moved by the operator, the locking pin 170' automatically returns to its original position to, in turn, return the valve plunger 203' to its original position to release the brakes of the vehicle.

*Detailed description*

Figure 1:
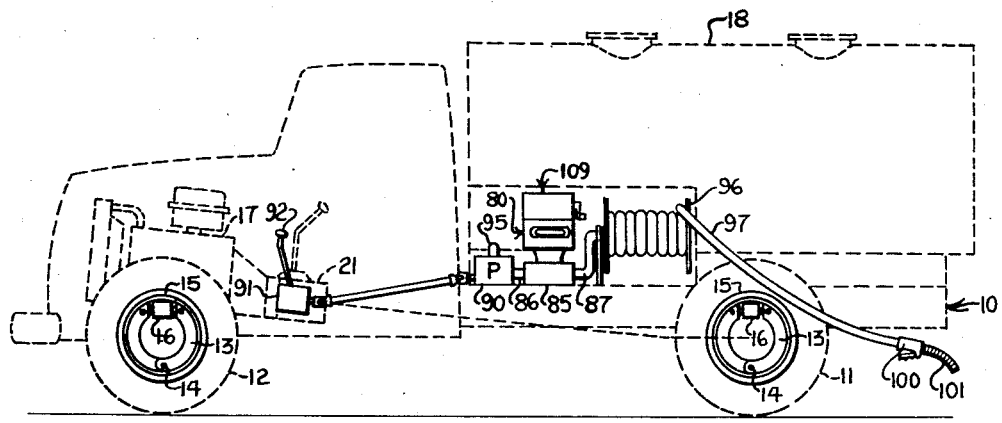
Figure 1 is a somewhat schematic side elevation of a fuel-oil or other fuel delivery truck, shown in broken lines, showing the fuel dispensing mechanism in association therewith in solid lines and also showing the brakes of the vehicle in solid lines.

Referring to Figures 1 and 2, a fuel-oil truck or other vehicle, shown in phantom lines, comprises a chassis generally designated at 10 which is mounted on rear wheels 11 and front wheels 12 each of which is provided with the usual brake shoes 13 which are pivotally interconnected, as at 14, at corresponding ends thereof, and the other ends of which are connected to opposite sides of a hydraulic cylinder mechanism 16 of conventional or any other desired construction. Each of the pairs of brake shoes 13 is surrounded by the usual brake drum 15 carried by the conventional axle supports, not shown, in a well known manner.

The chassis 10 also supports a suitable fuel reservoir or tank 18 and an internal combustion engine 17 having an intake manifold 20. The internal combustion engine 17 drives suitable gearing, not shown, forming parts of a conventional transmission 21 having suitable connections, not shown, extending therefrom to the rear wheels 11 of the vehicle. The chassis 10 also carries a conventional master cylinder 25 of the braking system of the vehicle which is actuated by the usual brake pedal 26 (Figure 2).

The master cylinder 25 has one end of a pipe or conduit 27 connected thereto, the other end of which is connected to a conventional brake booster assembly broadly designated at B (Figures 2, 17 and 18). There are many different types of brake boosters with which the present invention may be associated and the brake booster B is of a type disclosed in Shop Manual for Ford F-Series Trucks; Form 7099-A and copyrighted 1951 by Ford Motor Company, Dearborn, Michigan.

This type booster comprises a hollow member or diaphragm housing 30 in which a movable piston or diaphragm 31 is mounted and which is normally biased to the left by a spring 32 in Figures 17 and 18. The diaphragm 31 has a slave cylinder piston 33 connected thereto by means of a rod 33a. The slave cylinder piston 33 is mounted for longitudinal movement in a slave cylinder 34. The slave cylinder 34 is suitably secured to the housing 30 and has an enlarged valve body 35 integral therewith.

It will be observed, in Figures 17 and 18, that the diaphragm 31 in the housing 30 of the booster B defines chambers 36 and 37 and a pipe or conduit 40 communicates with the chamber 36. The pipe or conduit 40 extends from the chamber 36 of the booster B (Figure 2) to the manifold 20 of the truck engine 17 and normally maintains a uniform pressure in both of the chambers 36 and 37, as will be presently described.

Referring again to Figures 17 and 18, it will be observed that the valve body 35 of the booster B has a movable control valve plunger 41 therein which is movable radially of the axis of the slave cylinder 34 and the valve body 35 is provided with a passageway 42 which communicates with the interior of the slave cylinder 34. One end of the slave cylinder piston 33 has a cavity 43 therein which is normally closed by a closure member 44 carried by the slave cylinder 34 when the brakes of the vehicle are released and during which the diaphragm 31 occupies the position shown in Figure 17. Passageways 45 are provided in opposite sides of the slave cylinder piston 33 and, when the slave cylinder piston 33 is in the position shown in Figure 17, these passageways 45 serve to establish communication between the pipe 27, which extends from the master cylinder 25, and the passageway 42.

The plunger 41 has a channel 48 therein and a diaphragm 46 connected thereto. The diaphragm 46 is normally urged downwardly against a shoulder 51 in the valve body 35 by a spring 52. The valve body 35 has a chamber 53 therein in which the diaphragm 46 and spring 47 are disposed. The valve body 35 also has passageways 55 and 56 therein which communicate with the chamber 53. The passageway 55 also communicates with the chamber 36 in the diaphragm housing 30 and the passageway 56 communicates with a pipe 57 connected to the valve body 35.

It will be noted that the valve body 35 has a passageway 60 in the upper portion thereof (Figures 17 and 18) which communicates with a breather pipe or air inlet pipe 61 connected to the valve body 35, this pipe 61 extending to a suitable air filter or breather 62 (Figure 2).

While the internal combustion engine 17 is running, the negative pressure in the intake manifold 20 causes negative pressure in the chamber 36 which, in turn, normally causes negative pressure in the passageway 55, channel 48, passageway 56 and pipe 57. It will be noted that a pipe or conduit 65 also communicates with the chamber 37 in the diaphragm housing 30. Now, heretofore, a single pipe or conduit has been provided in lieu of the pipes or conduits 57 and 65 to thereby maintain communication between the passageway 56 and the chamber 37. Thus, the negative pressure normally present in the pipe 40 normally created a uniform negative pressure in both of the chambers 36 and 37. Since the negative pressure was the same on both sides of the diaphragm 31, the compression spring 32 normally urged the diaphragm 31 to a position immediately adjacent the left-hand wall of the diaphragm housing 30 as shown in Figure 17.

Now, in normal operation of the braking system of the vehicle, the operator depresses the brake pedal 26 thereby causing fluid to flow through the pipe 27, through the passageways 45 in the slave cylinder piston 33 and into the passageway 42 in the valve body 35. The slave cylinder piston 33 also has a check valve mechanism generally designated at 66 therein and, as the fluid is admitted to the slave cylinder passageway 45, it first passes around the slave cylinder check valve 66 and through the slave cylinder piston 33, through a pipe or conduit 67, which is connected to and communicates with the right-hand end of the slave cylinder 34 in Figure 17.

This pipe 67 extends to a pipe 70 (Figure 2), opposite ends of which are connected to transverse pipes 71 and 72. Opposite ends of the transverse pipes 71 and 72 are connected to the corresponding hydraulic brake cylinders 16 associated with the wheels 11 and 12. This displacement of fluid builds up the hydraulic line pressure in a well known manner and, when the fluid pressure reaches approximately forty pounds per square inch, the control valve plunger and piston 41 moves upwardly into contact with the lower surface of the control valve disk 50.

This seals the engine vacuum in the chamber 36 of the diaphragm housing 30 and, as the plunger 41 continues to move upwardly in Figure 17, the control valve disc 50 is forced from its seat, admitting air under atmospheric pressure through the breather or air cleaner 62 and the pipe 61, through the passageway 60 and thus into the chamber 53 above the diaphragm 46. This air then passes through the passageway 56 and, heretofore, has passed through the said pipe provided in lieu of the pipes 57 and 65 to the chamber 37. The atmospheric pressure in the chamber 37 forces the diaphragm 31 to the right from the position shown in Figure 17 to substantially the position shown in Figure 18, thereby moving the slave cylinder piston 33 therewith to build up the hydraulic line pressure in the slave cylinder 34 and the pipes 67 and 70 to 72, inclusive, whereupon the wheel cylinders 16 cause the brake shoes 13 to move outwardly against the brake band 15 to lock the brakes of the vehicle.

The structure heretofore described is typical of the usual braking system of an automotive vehicle and only the elements necessary to a clear understanding of the present invention have been described, since the structure and function of a booster actuated braking system is well known in the art. It is with a braking system of this type, in combination with a meter recording device of the type to be presently described, that the present invention is adapted to be associated.

Meter recording device

As heretofore described, the meter recording device is preferably of the type disclosed in the patent to McMullen, No. 2,086,363 dated July 6, 1937. It is also disclosed in other patents including Numbers 1,922,056, 1,967,677, 2,099,129, 2,245,032, and 2,285,825. Therefore, a complete description of the meter recording device will not be given, but sufficient description thereof will be given to clearly ascertain the manner in which it cooperates with the present invention.

The meter recording device comprises a meter register and a recording printing mechanism which are broadly designated at 80 and 81, respectively. The meter register 80 is of the usual type having a window 82 in the front wall of the casing thereof through which register wheels 83 may be viewed by the operator and which register wheels 83 are driven by suitable means, not shown, disposed within the housing of the meter register 80. The means for driving the register wheels 83 includes a vertical drive shaft 84 which extends downwardly in Figure 3 and the lower end of which is connected to a meter 85 (Figures 1 and 2) or other suitable means driven by the flow of fuel from a pipe 86 to a pipe 87. The end of the pipe 86 remote from the meter 85 is connected to a suitable pump 90. The pump 90 and the meter recording device are both suitably supported on the chassis 10 of the truck.

The pump 90 may be of any desired construction, however, the pumps associated with delivery trucks are invariably driven by means of the internal combustion engine 17 of the truck. To this end, the pump 90 is coupled to an auxiliary transmission 91, shown schematically in Figures 1 and 2, and which has suitable gearing, not shown, therein connecting with the conventional gearing in the transmission 21 for imparting rotation to the mechanism of the pump 90 by manipulation of a shifting lever 92, as desired.

Since the pump 90, the transmission 91 and the intervening connections are conventional, no attempt has been made in this context to specifically define their structure and manner of operation, these parts merely being shown schematically to indicate that the pump 90 is driven by the internal combustion engine 17 of the vehicle.

The pump 90 has a pipe 95 extending therefrom to the fuel tank 18 and, thus, the pump 90 pumps the fuel past the meter 85 and to a reel 96 of conventional construction about which a hose or flexible pipe 97 is wound. Of course, one end of the flexible pipe or hose 97 is communicatively connected to the pipe 87 in the usual manner and the other end thereof has a suitably manually operable valve mechanism 100 thereon to which a nozzle 101 is connected.

Figure 3:
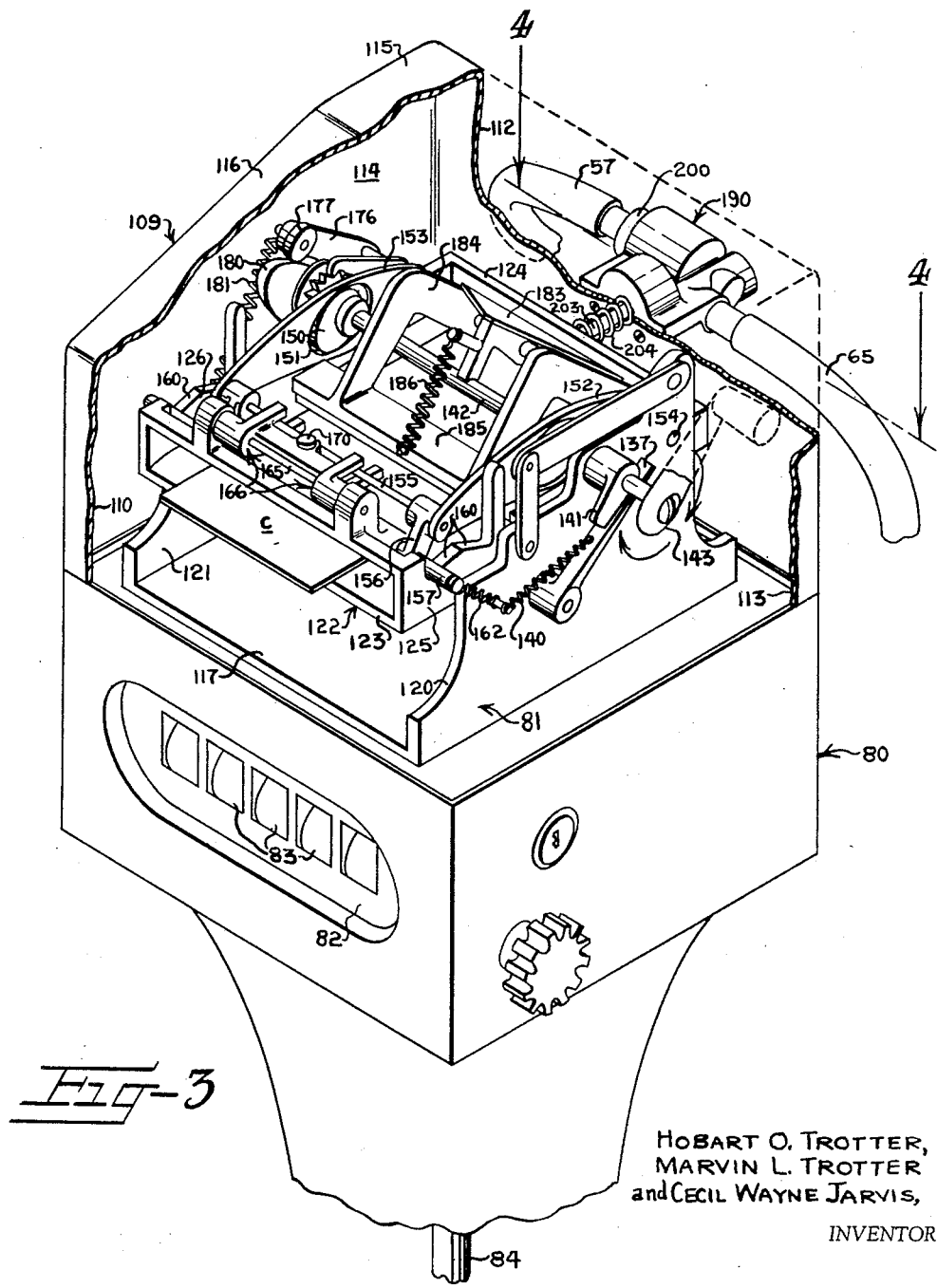
Figure 3 is an enlarged isometric view of the meter recording device shown in the lower central portion of Figure 1, with the upper portion of the housing thereof broken away to illustrate the recording printing mechanism of the meter recording device, and showing one arrangement of the meter controlled brake operating valve in association therewith.

The shaft 84 in Figure 3 is the equivalent of the shaft 45 shown in Figure III of said McMullen Patent Number 2,086,363 and the register wheels 83 disposed within the casing or housing of the meter register 80 may be constructed and driven in the identical manner to that shown in said last-named McMullen patent.

The casing 109 for the recording printing mechanism 81 is supported by the casing of said meter register 80 and comprises a front wall 110 which is provided with a transverse or horizontal saleslip receiving slot 111 (Figure 13). The casing 109 of the recording printing mechanism 81 also comprises a rear wall 112, side walls 113 and 114 (Figure 3) and a top wall 115, the front portion of which is inclined downwardly and forwardly at 116.

It is preferable that the lower edges of the walls 110, 112, 113 and 114 of the casing 109 are sealed in engagement with the corresponding walls of the casing of the meter register 80 as by a bead of wax or soft metal, such as lead and the like, as at 116a, so the user of the apparatus may not remove the casing 109 of the recording printing mechanism 81 from engagement with the casing of the meter register 80 without the removal thereof being detected by the user's employer.

*Recording printing mechanism*

The recording printing mechanism comprises a frame 117 having spaced side plates 120 and 121 and which frame is suitably secured to the upper wall of the casing of the meter register 80. A saleslip carriage broadly designated at 122 is mounted for horizontal movement between the side plates 120 and 121. The saleslip carriage 122 comprises a front transverse throat portion 123, a rear transverse portion 124 and side flanges 125 and 126.

A printing type wheel shaft 130 is fixed in the side plates 120 and 121 and has a plurality of printing type wheels 131 mounted thereon, some of which are driven by conventional means, not shown, connected with the shaft 84 (Figure 3) for recording the number of gallons or pounds and tenths of a gallon or of a pound previously dispensed, by making an imprint upon a saleslip or card C inserted through the opening 111 in the front wall 110 and through the throat 123 of the saleslip carriage 122 as is clearly shown in said Patent No. 2,086,363.

Others of the printing type wheels 131 are used to print a different serial number each time fuel is dispensed and, to this end, a conventional shaft 133 is rotatably supported by the side plates 120, 121 and has rigidly connected therewith a ratchet wheel 134 which has ten teeth and is turned one tenth of a revolution each time it is desired to advance the serial number. Such advancement of the serial number is effected by a pawl 136 which engages the wheel 134 and is pivotally mounted intermediate the ends of a cam lever 137.

Said cam lever 137 is fulcrumed on the transverse shaft 130 and said lever 137 is continuously pressed upwardly by a spring 140. As shown in said Patent No. 2,086,363, the lever 137 is in cooperative relation with a cam 141 fixed on a shaft 142 provided with a manually operative crank handle 143 shown in phantom lines in Figures 6, 10, 12 and 15 and which is used to operate said lever 137 only after the start of the instant dispensing operation; said lever 137 being inoperative to advance the serial number except when released by the initial rotary movement of the shaft 84 as clearly set forth in said Patent No. 2,086,363.

It will be observed in Figure 7 that the shaft 133 has a gear 143 fixed thereon which meshes with an eight-toothed gear 144 loosely journaled on a transverse shaft 145 which is, in turn, journaled in the opposite side plates 120 and 121 of said frame 117. The gear 144 meshes with a gear 146 loosely journaled on the shaft 130 and said gear 146 carries one of the decimally numbered serial numbering type wheels 131. There are usually three of the printing wheels 131 employed as serial number printing wheels which are interconnected, as disclosed in said Patent No. 2,086,363, in such a manner that, upon each revolution of the printing wheel 131, which is carried by the gear 146, the adjoining wheel will move one step and, upon said adjoining wheel completing a revolution, a step will be imparted to the next adjoining wheel.

In order to effect reciprocatory horizontal movement to the saleslip carriage 122 between its two printing positions, the crank shaft 142, provided with said crank handle 143, has, rigidly connected therewith, opposite counterpart cams 150 (Figure 3) which engage in openings 151 in rocker frame members 152 and 153, which are levers fulcrumed on a transverse shaft 154 journaled in said side plates 120 and 121 of the frame 117.

A rock shaft 155 is journaled in the free ends of said rocker frame members 152, 153 and carries a pair of thrust arms 156 each having a crank 157 overhanging similar cam inclines 160 on the side plates 125 and 126 of said carriage 122.

At least one of said cranks 157 has a spring 162 connected thereto so as to continually stress said crank arms toward the vertical position shown in Figures 6, 8, 12 and 13 when they are released. Thus, when the crank arms 156 are in the position shown in Figures 6 and 8 relative to carriage 122, the cranks 157 overhang the left-hand or front slopes of the inclines 160 so that, upon clockwise rotation of said crank handle 143 and cams 150 (Figure 3), said thrust arms 156 are forced outwardly by traversing down said slope to thrust the carriage from the position shown in Figures 6 and 8 to the position shown in Figures 9, 10 and 11. Further turning movement of said handle 143 lifts said rocker members 152 and 153, releasing said thrust arms from said inclines 160 permitting them to be swung by their spring 162 back to vertical position; so that further turning movement of said handle 143 causes the cranks 156 to slide down the right-hand or rear slopes of said inclines 160 and thrust said carriage 122 rearwardly or to the right to the initial position shown in Figures 6 and 8.

Now, said carriage 122 has, at the left-hand or front end thereof in Figures 3, 6, 10 and 12, a stationary shaft 165 which is the fulcrum for a punch frame 166 provided with a vertically extending groove 167 in the inner or rear face thereof in which a headed punch pin 170 is loosely mounted. It will be observed in Figures 8, 9, 11, 13 and 14 that the punch pin 170 is mounted for free vertical movement in the throat portion 123 of the carriage 122.

Figure 10:
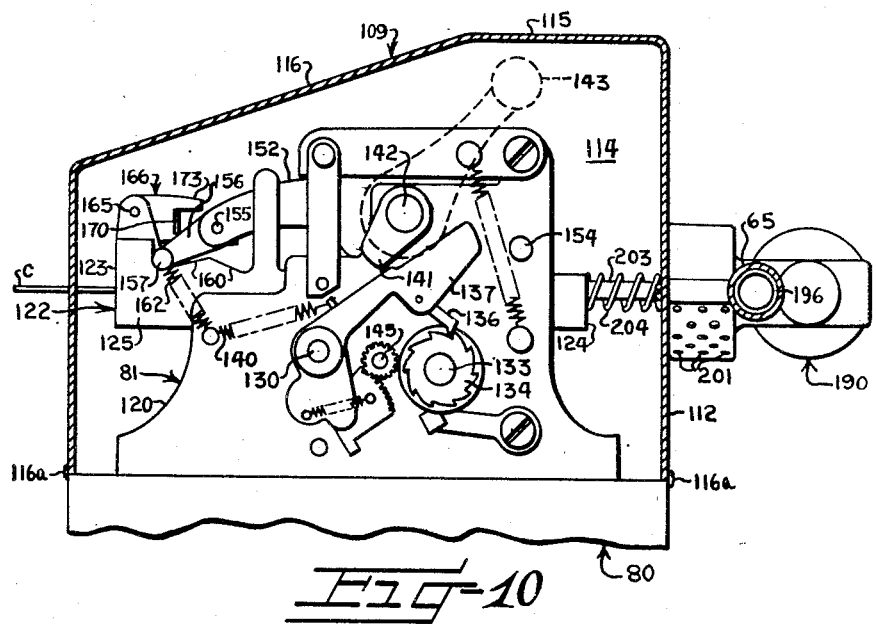
Figure 10 is a view similar to Figure 6 showing the movable parts of the recording printing mechanism in a different position as a result of turning the crank handle 43 approximately 110 degrees.

Thus, the punch frame 166 functions to alternately lift the punch pin 170 clear of the saleslip, packet or card C and to thrust the punch pin 170 through said saleslip, packet or card C; such movement being effected by said rock shaft 155 alternately engaging bifurcations 173 and 174 on said punch frame 166, which extend respectively above and below said rock shaft 155, as shown in Figures 10 and 16.

Referring to Figures 3, 8, 9, 11, 13, 14, and 16 it will be observed that the shaft 154 is rigidly connected with an arm 176 which carries a roller or cam follower 177 in cooperative relation with an evolute cam 180 fixed on the end of the crank shaft 142 opposite to that end to which the handle 143 is fixed. The follower 177 is maintained in engagement with the periphery of the evolute cam 180 by a spring 181 so that, as said crank shaft 142 is turned, the arm 176 is alternately thrust counter-clockwise from the position shown in Figure 16 to that shown in Figure 9, by its roller or follower 177 engaging said cam 180, and released as the crest 182 of said cam 180 passes beneath said roller 177.

Said shaft 154 is also rigidly connected with a cross head 183 which, as shown in Figure 3, overhangs supporting arms 184 of a platen 185, which arms 184 are journaled on said shaft 154. Said platen 185 is connected with said cross head 183 by a spring 186 (Figure 3) so that said platen 185 is lifted by that spring when the cross head 183 is uplifted by the evolute cam 180, but when said cross head 183 is released by the crest 182, of said cam passing counter-clockwise (Figures 13 and 14) beneath said roller 177, said cross head is snapped clockwise downward until it is stopped by engagement with the crank shaft 142; with the effect that said platen 185, knocked down by the cross head 183, stretches the spring 186 and strikes a hammer blow upon the saleslip or card C causing the latter to be imprinted by the numbered type wheels beneath it, but said platen 185 is thereafter instantly uplifted to the position shown in Figure 13 by the tension of said spring 186.

Now, it is extremely important to the operation of the present invention that the crest 182 of the evolute cam 180 is accurately located relative to the counterpart cams 150 for two reasons; the first reason being that it is essential that the punch pin 170 pierces the saleslip, packet or card C immediately before the initial downward stroke of the platen 185, which causes the first imprint to be made in the saleslip C by the number type wheel beneath it to thereby insure that the punch pin 170 is not lifted clear of the saleslip C until after a second downward movement of the platen 185 which results in a second imprint being made on the saleslip C by the number type wheels beneath it.

The second reason that the cams 150 and 180 must be accurately relatively positioned on the cam shaft 142 is to insure that the brakes of the automotive vehicle, with which the meter recording apparatus is associated, are automatically actuated or locked by movement of the saleslip carriage 122, as will be hereinafter described, immediately before the first downward movement of the platen and immediately following the second downward movement of the platen 185.

In the original form of the invention, shown in Figures 1 to 16, inclusive, the actuation of the brakes of the automotive vehicle or fuel-oil truck is controlled by the movement of the carriage 122 per se. In the second or modified form of the invention, shown in Figures 19, 20 and 21, the brakes are also controlled by the carriage 122 but, particularly, the brakes are controlled by the vertical movement of the punch pin 170′, as will be later described.

*Original or first form of the invention*

Now, heretofore, the operator or truck driver has been able to cheat his employer's customer, although the card or saleslip C is locked in the recording printing mechanism 81 by the punch pin 170 during the dispensation of fuel-oil or the like. This is due to the fact that, upon delivering a desired amount of fuel-oil or the like to said customer, the operator or truck driver could leave the card or saleslip C in the recording printing mechanism 81, drive the truck or other vehicle to another location, and dispense an additional desired amount of fuel-oil or the like to another point or at his own residence, after which he could again turn the crank 143 to imprint the number of gallons dispensed, etc. on the card or saleslip C and to release the card or saleslip C from the recording printing mechanism 81. The truck driver could then return to the original point of dispensation of the fuel-oil or the like and present the saleslip to the employer's customer and the employer's customer would assume that he had received all of the fuel-oil or the like, as indicated on the saleslip, that had been dispensed from the fuel-oil truck or other vehicle.

In order to insure that the truck driver or operator cannot move the truck from one point to another until the card or saleslip C is imprinted with the serial number and the amount of gallons or pounds of fuel-oil or other fluid or gas dispensed, we have provided means for actuating the brakes of the fuel-oil truck or other vehicle and for maintaining said brakes in a locked state during the entire interim from the time that the card or saleslip C is initially imprinted or marked with the numerals on the uppermost portions of the number type wheels 131 therebeneath and until the card or saleslip C is again imprinted, stamped or marked with the numerals which then appear in the uppermost position on the number type wheels 131.

Figure 5:
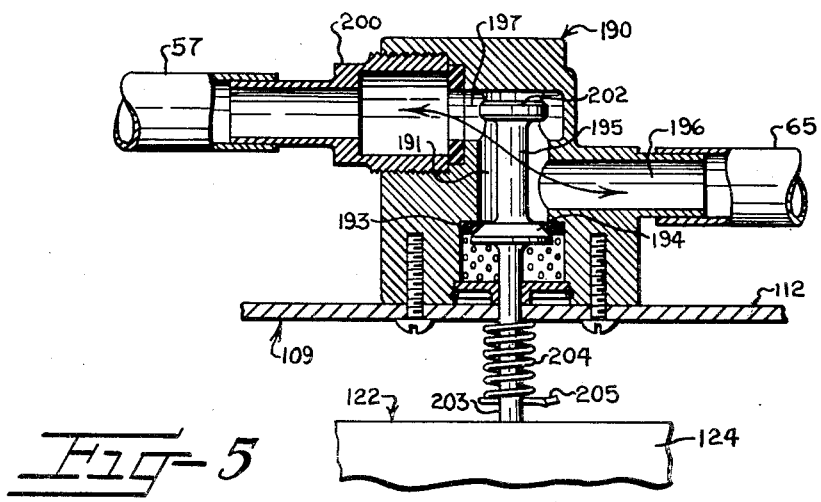
Figure 5 is view similar to Figure 4, but showing the valve plunger in closed position.
Figure 4:
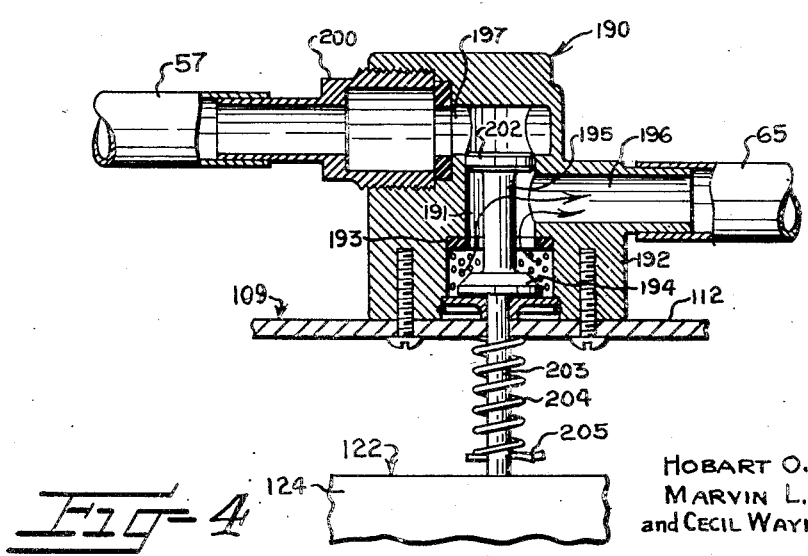
Figure 4 is an enlarged sectional plan view, taken substantially along the line 4—4 in Figure 3, showing the valve plunger in opened position.

To this end, in the original form of the invention, we have provided a valve mechanism broadly designated at 190, which is shown in detail in Figures 4 and 5. The valve 190 is suitably secured to the rear wall 112 of the casing 109 of the recording printing mechanism, as is most clearly shown in Figure 3, so that the spring-loaded plunger thereof, to be presently described, is disposed at the same level as the carriage 122. This valve 190 may be of any desired construction and is preferably substantially of the type disclosed in a patent to Russell, Number 2,329,087 of September 7, 1943, but wherein the ball check valve is omitted. The valve 190 is of a type which is normally closed; that is, it normally maintains communication between the pipes 57 and 65 connected to opposite sides thereof while preventing atmosphere to enter either pipe 57 or 65. The pipes 56 and 57 and the valve 190 are the main components of the present invention.

The valve 190 has chambers 191 and 192 therein, the chamber 192 being larger than the chamber 191 and having a resilient valve seat washer 193 therein which forms a shoulder against which an enlarged tapered portion 194 of a valve core 195 is adapted to alternately be positioned as shown in Figure 5. The valve 190 has a tubular portion forming a passageway 196 therein to which the pipe 65 is connected for communication therewith. The valve 190 also has a passageway 197 therein which communicates with the upper portion of the chamber 191. The valve 190 has a tubular fitting 200 threadably connected thereto which communicates with the passageway 197 and to the outer end of which the pipe 57 is connected for communication therewith.

It will be noted that the lower wall defining the chamber 192 has a plurality of openings or orifices 201 formed therein for admitting atmosphere to the chamber 191 when the valve core 195 is in the opened position shown in Figure 4.

The valve core 195 also has an enlarged head portion 202 mounted for longitudinal sliding movement in the chamber 191 and a reduced stem portion or spring-loaded plunger 203 projects axially from the enlarged tapered portion 194 of the valve core 195 and slidably penetrates the wall 112 of the casing 109 of the recording printing mechanism 81. The stem portion 203 of the valve core 195 is surrounded by a compression spring 204, one end of which bears against the wall 112 and the other end of which engages an abutment 205, such as a cotter pin, carried by the stem portion 203 of the valve core 195. The spring 204 urges the plunger 203 into engagement with the rear portion 124 of the carriage 122.

Thus, when the plunger 203 is in the position shown in Figures 5, 6, 8, 15 and 16, it permits negative pressure to pass through the pipes 65 and 57, which then serve the purpose of the single pipe heretofore provided in lieu of pipes 65 and 57, as heretofore described. On the other hand, when the spring-loaded plunger 203 is in the position shown in Figures 3, 4 and 9 to 14, inclusive, the enlarged portion 194 of the valve core 195 is unseated and permits atmosphere to enter the chamber 192 and 191 through the orifices 201 and, of course, permits atmosphere to enter the passageway 196, pipe 65 and the chambers 37 in the diaphragm housing 30 (Figures 17 and 18) of the booster B.

However, the enlarged portion 202 of the valve core 195 then prevents atmosphere from entering the passageway 197, fitting 200, pipe 57 and chamber 36 of the diaphragm housing 30. Thus, although the diaphragm 46 and valve member 41 may remain in the normal position shown in Figure 17, atmosphere is permitted to enter the chamber 37 of the diaphragm housing 30 without depressing the brake pedal 26 (Figure 2), which will have substantially the same effect as that of depressing the brake pedal 26; that is, diaphragm 31 moves from the position shown in Figure 17 to the position shown in Figure 18, due to the negative pressure present in the chamber 36 of the diaphragm housing 30, to thereby direct fluid from the slave cylinder 34 to the brake cylinders 16 to lock the brakes of the vehicle.

Now, as heretofore stated, when each saleslip or card C is inserted in the throat portion 123 of the saleslip carriage 122, the carriage 122 and the cranks 157 occupy the position shown in Figures 6 and 8. It will be noted that, at this time, the plunger 203 of the valve core 195 occupies the closed position shown in Figure 5, thereby permitting the normal negative pressure to pass through the pipes 57 and 65.

Figure 11:
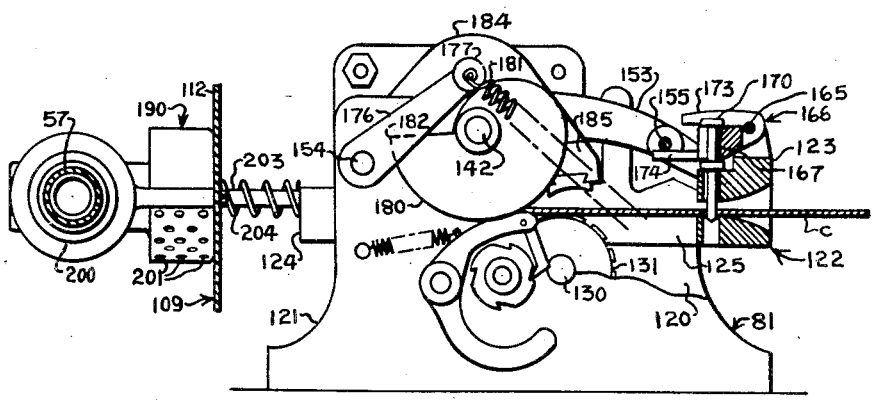
Figure 11 is a view similar to Figure 8, but showing the movable parts of the recording printing mechanism in positions corresponding to Figure 10.

After the operator has inserted the saleslip or card C, he then turns the handle 143 clockwise a first complete revolution, in the course of which the evolute cam 180 rotates in a counter-clockwise direction from its initial or normal position in Figure 8, through the position shown in Figure 9, through the position shown in Figure 11 and stops in the position shown in Figure 13, which position is identical to that shown in Figure 8, but the carriage 122 is then in a different position from that shown in Figure 8. The carriage is moved because of the cranks 157 on the thrust arms 156 being forced outwardly or forwardly by traverse down the front slopes of the inclines 160, with the result that the carriage is thrust from the position shown in Figures 6 and 8 to the position shown in Figures 9 to 13, inclusive.

Now, it will be observed that, in the course of said first revolution of the handle 143, the crest 182 of the evolute cam 180 passes beneath roller 177 immediately after the punch pin 170 has pierced the saleslip or card C and simultaneously with movement of the saleslip carriage 122 to its foremost or outermost position relative to the rear wall 112 of the recording printing mechanism casing 109.

This insures that atmosphere is permitted to enter the valve chambers 192 and 191 and, of course, the chamber 37 of the booster B immediately before, or at the same time that, the crest 182 of the evolute cam 180 moves out of engagement with the roller 177, which causes the card or saleslip C to be imprinted by the number type wheels 131 beneath it in the manner heretofore described.

It is extremely important that the card or saleslip C is pierced by the pin 170 before the numerals are imprinted on the card or saleslip C in order to insure that the operator or the truck driver cannot remove the card or saleslip C after the serial number and the numbers on the remaining printing type wheels 131 have been imprinted thereon and before the card is locked in the carriage 122 by the punch pin 170.

The operator or truck driver then dispenses the desired amount of fuel-oil, gas or the like through the nozzle 101 (Figure 2) and, thereafter, he turns the handle 143 a second time in a clockwise direction for a second complete revolution, in the course of which the cranks 157 on the thrust arms 156 again move downwardly and traverse the inner or rear slopes of the inclines 160 to thrust the carriage rearwardly thereby returning the same to the position shown in Figure 8. However, before the carriage 122 has reached the limit of its inward or rearward movement, the crest 182 of the evolute cam 180 passes beneath the roller or follower 177 thereby causing the platen 185 to again strike a hammer blow upon the saleslip or card C and causing the latter to be imprinted with the uppermost numerals on the printing type wheels 131 beneath the same, immediately before the carriage 122 reaches the limit of its inward or rearward movement.

Thus, the brakes of the vehicle remain locked until after the second imprint has been made on the card or saleslip C, since a very small space between the enlarged portion 194 of the valve core 195 and the sealing ring 193 permits atmosphere to enter the pipe 65.

Moreover, by referring to Figure 16, it will be observed that the crest 182 of the evolute cam 180 has moved beyond the roller 177, but the punch pin 170 still extends through the card or saleslip C and, since the platen 185 causes the numerals to be imprinted on the card or saleslip C simultaneously with movement of the plunger 203 to the position shown in Figure 5, although the brakes of the truck or other vehicle would then be released, the second set of numerals will have already been imprinted on the card or saleslip C and it will, therefore, be necessary for the operator to continue rotating the handle 143 until the punch pin 170 has returned to the position shown in Figure 8 before the operator could remove the card or saleslip C from the saleslip carriage 122.

It is evident that, if the operator moved the truck or other vehicle to another location and dispensed fuel or the like therefrom before removing the card or saleslip C after the second set of numerals had been imprinted thereon, this would interrupt the continuity of the numerals on successive saleslips, whereby the operator's employer could readily determine that fuel-oil has been removed from the tank 18 of the truck between the time that the second set of numerals were imprinted on a given saleslip and the time that a first set of numerals were printed on a succeeding saleslip C.

Since it is extremely important that the atmosphere is not permitted to enter both of the pipes 57 and 65 before the second set of numerals are imprinted on the card or saleslip C, it is thus seen why the crest 182 of the evolute cam 180 must be accurately located relative to the cam 150 and, also, relative to the cranks 157 on the ends of the thrust arms 156.

It might be stated that the sudden movement of the roller 177, after the crest 182 of the cam 180 has passed therebeneath, imparts momentary snap-like rotational movement to the cam 180 and cam shaft 142 so that the roller 177 engages the low point of the cam 180 at substantially the position shown in Figure 11. Of course, this throws the carriage 122 from the position shown in Figures 13 and 14 to the position shown in Figure 16 so the follower 177 engages the low point of the cam 180 substantially as shown in Figure 16. Thus, it is practically impossible to move the carriage 122 far enough toward the wall 112 to release the brakes of the vehicle before downward movement of the platen 185 has struck the saleslip C in the carriage 122, thus insuring that the serial number and the number of gallons or pounds of fuel dispensed are imprinted on the saleslip C at the time that the brakes are released.

*Modified or second form of invention*

Referring to Figures 19 to 21, inclusive, there is shown a second form of the invention which differs from the original form of the invention only as to the location of the valve 190 and the manner in which it is actuated. In Figures 19, 20 and 21, the valve mechanism is indicated at 190' and the recording printing mechanism is indicated at 81' and, since the valve mechanism 190' is substantially the same as the valve mechanism 190 shown in Figures 4 and 5 and, also, since the recording printing mechanism 81' is identical to the recording printing mechanism 81 shown in Figures 3 and 6 to 16, inclusive, those parts associated with the valve 190' and mechanism 81' shall bear the same reference characters as the parts associated with the valve 190 and the recording printing mechanism 81, but shall have the prime notation added.

The valve 190' differs from the valve 190 (Figures 4 and 5) only to the extent that the length of stroke of the plunger 203' must be relatively short to insure that the lower end of the plunger 203' will not extend below the level of the upper end of the punch pin 170' when the punch pin is in lowered or operative position as shown in Figures 20 and 21.

In this instance, in order to accommodate the valve 190' so that the axis of the core 195' thereof extends substantially perpendicular to the saleslip carriage 122', the inclined portion 116' of the casing 109' of the recording printing mechanism 81' has a horizontal portion 210 thereon which may be formed integral therewith or a block of the desired configuration may be secured to the inclined portion 116' of the casing 109', if desired. The valve 190' is suitably secured to the upper surface of the horizontal portion 210 of the top wall 115' of the casing 169' and the stem portion or plunger 203' of the core 195' of the valve 190' loosely penetrates the portion 210.

In this instance, in order to limit downward movement of the plunger 203', the valve 190' has an additional chamber 211 therein in which the enlarged portion 202' of the plunger 195' has longitudinal sliding movement. Thus, the enlarged portion 202' is of greater diameter than the diameter of the chamber 191 and, therefore, as the valve core 195 moves from the position shown in Figure 19 to that shown in Figures 20 and 21, the enlarged portion 202' of the valve core 195' seats against the upper end of the chamber 191 to limit downward movement of the plunger 203' and to also cause atmosphere to enter the chambers 192' and 191' and to enter the pipe 65. Of course, the enlarged portion 202' of the core 195' then prevents atmosphere from entering the pipe 57.

Now, the illustration in Figure 19 corresponds to the illustration in Figure 8 to the extent that the saleslip carriage 122' is in its forward position and the punch pin 170' is in raised position. The punch pin 170' is then in alinement with the plunger 203' of the valve core 195' which is thus held in raised position to permit negative pressure to pass through the valve 190' and the pipes 57 and 65, thereby releasing the brakes of the fuel-oil truck or vehicle.

When the operator is about to dispense fuel-oil or the like from the tank 18 of the truck, the saleslip or card C' is inserted in the throat 123' of the carriage 122' as is shown in Figure 19, whereupon the carriage 122' is moved forwardly or outwardly to the position shown in Figure 20 in the manner heretofore described. The parts of the recording printing mechanism 81' shown in Figure 20 are in position corresponding to the position of the parts of the recording printing mechanism 81 in Figure 11 and, as heretofore stated, the punch pin 170' is thrust through the card or saleslip C' before the platen 185' strikes a hammer blow upon the card or saleslip C' to thereby insure that the card or saleslip C' cannot be removed from the carriage 122' until after the second set of numerals have been imprinted on the saleslip or card C'.

Of course, as the punch pin 170' moves downwardly from the position shown in Figure 19 to that shown in Figure 20, this permits the valve core 195' to move downwardly and thereby permits atmosphere to enter the pipe 65 to lock the brakes of the vehicle. After the desired amount of fuel-oil or the like has been dispensed, the carriage is again moved, in the manner heretofore described, to the position shown in Figure 21, wherein associated parts occupy substantially the same position as the corresponding parts shown in Figure 15.

Upon the carriage 122' reaching the position shown in Figure 21, the platen 185' again strikes the card or saleslip C' causing the second set of numerals to be imprinted thereon. However, since the punch pin 170' is still in a lowered position, the brakes of the vehicle remain locked until after the second set of numerals have been imprinted on the saleslip or card C'. Thus, further turning movement of the handle for operating the carriage 122' is required in order to uplift the punch pin 170' to return the same to the position shown in Figure 19. It is evident that the brakes of the vehicle are then released and the card or saleslip C' may then be removed from the recording printing mechanism 81'.

The modified form of the invention shown in Figures 19, 20 and 21 has the advantage over the original form of the invention shown in Figures 3 to 16, inclusive, in that the crest 182' of the evolute cam 180' need not be positioned as accurately relative to the other cams on the cam shaft 142', since the valve 190' is controlled solely by the punch pin 170' rather than by the horizontal movement of the carriage 122'.

It is evident in both forms of the invention that all connections between the recording printing mechanisms 81 or 81' and the booster B should be sealed with wax, lead or by other means at their junctures so that, if the truck driver attempts to disconnect any of the pipes, the corresponding valves 190 or 190', or any other parts of the brake system, this may be readily detected by the truck driver's employer.

It is thus seen that we have provided means for automatically locking the brakes of a fluid dispensing vehicle provided with a meter recording device upon the serial number and number of gallons being initially imprinted on the saleslip C and for maintaining said brakes in a locked state until after a second imprint, indicating the number of gallons dispensed and the serial number, is made on the saleslip and wherein the saleslip is locked in the recording printing mechanism prior to the initial printing of the recording printing mechanism and until after the second actuation of the recording printing mechanism, thereby preventing the operator from moving the truck or other vehicle after the recording printing mechanism has been initially actuated and until after the recording printing mechanism has been actuated a second time.

In the drawings and specification there have been set forth preferred embodiments of the invention and, although specific terms are employed, they are used in a generic and descriptive sense only and not for purposes of limitation, the scope of the invention being defined in the claims.

We claim:

1. In a mobile fluid dispensing vehicle having a braking system and also having a meter recording device provided with a saleslip for first recording a reading on a saleslip prior to the dispensation of fluid from the vehicle while securing the saleslip therein against removal and then secondly recording the reading thereon on said saleslip following the dispensation of fluid from the vehicle and whereupon the saleslip is released from the meter recording device, the combination therewith of means responsive to the first-named recording on the saleslip for actuating the braking system, and means responsive to the second-named recording on the saleslip for releasing the braking system.

2. In a fluid dispensing vehicle having a braking system provided with a hollow member having a first movable element therein defining first and second chambers in said hollow member, there normally being a negative pressure in both of said chambers, means establishing communication between said chambers, and a meter recording device having manually operable serial numbering means thereon; the combination of a valve interposed in said means for establishing communication between said chambers, a second movable element disposed in said valve and normally positioned to effect communication between said chambers, means operable automatically upon alternate operations of the serial numbering means to move the second movable element to an alternate position to admit atmosphere to the first chamber while preventing atmosphere from entering the second chamber thereby causing the negative pressure to be maintained in the second chamber whereby the negative pressure in said second chamber will cause the first movable element to move toward and reduce the size of the said second chamber, and intervening operations of the serial numbering means causing said second movable member to return to its normal position to reestablish communication between said chambers.

3. In a fluid dispensing vehicle having a braking system and also having a meter recording device for recording on a saleslip serial numbers and amounts of fluid dispensed and wherein serial numbers are recorded on the saleslip before and after each dispensation of said fluid, the combination of means operable automatically for rendering the braking system operative to lock the brakes of the vehicle upon the serial numbers initially being recorded on the saleslip, and means operable automatically for rendering the braking system inoperable to release said brakes upon the second recording of the serial numbers on each saleslip and following the dispensation of an amount of fluid coinciding with the numbering recorded on the saleslip.

4. In a mobile fluid dispensing vehicle having a braking system provided with a hollow member having a first movable member therein defining first and second chambers in said hollow member and resilient means normally urging the first movable member towards said first chamber, means normally creating negative pressure in the second chamber, a conduit connecting said first chamber with the second chamber whereby said negative pressure is also normally present in the first chamber, said vehicle also having a meter recording device of a type adapted to receive a saleslip and to record a reading thereon while locking the saleslip therein and for subsequently finally recording on said saleslip the reading on said device while substantially simultaneously releasing the saleslip therefrom; the combination of a valve interposed in said conduit between said chambers of the hollow member, a plunger in said valve, means normally maintaining said plunger in one position to maintain communication in said conduit and between said first and second chambers, means operable automatically upon the said initial recording for moving said plunger to another position to admit atmosphere to said first chamber and to prevent atmosphere from entering said second chamber whereby the negative pressure in the second chamber will cause the first movable member to move toward the second chamber for actuating said braking system, and means operable automatically to return said plunger to its original position and to re-establish communication between said first and second chambers upon said final recording and to thereby render said braking system inoperative.

5. In a vehicle having a braking system including a brake booster having a diaphragm therein defining first and second chambers in the booster, spring means normally urging the diaphragm toward the first chamber to maintain the brakes in a released state, means to create negative pressure in the second chamber, a conduit connected to each chamber, a meter recording device having means for receiving a saleslip and initially recording the meter reading thereon while locking the saleslip therein, said means for recording also being operable a second time for each saleslip to record a second meter reading thereon and to simultaneously release the saleslip from the meter recording device; the combination of a valve carried by said meter recording device, said conduits being connected to opposite sides of said valve, a movable member in said valve, means on said recording device for normally maintaining said movable member in a first position so as to establish communication between said conduits whereby a negative pressure is effected in the first chamber equal to the negative pressure in the second chamber, means operable automatically upon said initial recording being made on the saleslip for moving and maintaining the movable member in a second position to prevent communication between said conduits, said valve having means to admit atmosphere to the conduit connected to the first chamber and, thus, to the first chamber when the movable member is in said second position to thereby activate said braking system, and means operable automatically upon the second recording being made on the saleslip for returning the movable member to its original position to again effect communication between the conduits and the first and second chambers to de-activate said braking system.

6. In a vehicle having a braking system including a brake booster having a diaphragm therein defining first and second chambers in the booster, resilient means normally urging the diaphragm toward the first chamber to maintain the brakes in a released state, means to create negative pressure in the second chamber, a conduit connected to each chamber, a reservoir carried by the vehicle, manually operable means for dispensing fluid from the reservoir, a meter recording device having a recording printing mechanism thereon with portions thereof actuated by the flow of fluid during dispensation thereof, said recording printing mechanism having a carriage for receiving a saleslip, manually rotatable means for moving said carriage and to simultaneously imprint the meter reading on the saleslip while locking the saleslip therein, said means for initially imprinting the meter reading also being operable a second time for each saleslip to imprint a second meter reading thereon and to simultaneously release the saleslip from the meter recording device; the combination of a valve carried by said meter recording device, said conduits being connected to opposite sides of said valve, a movable member in said valve, means normally urging the movable member in said valve into engagement with the carriage of the recording printing mechanism to normally maintain said movable member in a first position so as to establish communication between said conduits whereby a negative pressure is present in the first chamber equal to the negative pressure in the second chamber, means operable automatically upon said initial imprint being made on the saleslip to move the carriage and the movable member to a second position to prevent communication between said conduits, said valve having means to admit atmosphere to the conduit connected to the first chamber and, thus, to the first chamber when the movable member is in said second position to thereby activate said braking system, and said carriage being movable automatically in the opposite direction upon the second imprint being made on the saleslip for returning the movable member to its original position to again effect communication between the conduits and the first and second chambers to de-activate said braking system.

7. In a vehicle having a braking system including a brake booster having a diaphragm therein defining first and second chambers in the booster, resilient means normally urging the diaphragm toward the first chamber to maintain the brakes in a released state, means to create negative pressure in the second chamber, a conduit connected to each chamber, a reservoir carried by the vehicle, manually operable means for dispensing fluid from the reservoir, a meter recording device having a recording printing mechanism thereon with portions thereof actuated by the flow of fluid during dispensation thereof, said recording printing mechanism having a carriage for receiving a saleslip, a movable locking pin carried by the carriage, manually rotatable means for moving said carriage and said pin relative to the carriage to simultaneously imprint the meter reading on the saleslip while locking the saleslip therein, said means for initially imprinting the meter reading also being operable a second time for each saleslip to record a second meter reading thereon and to simultaneously release the locking pin from engagement with said saleslip; the combination of a valve carried by said meter recording device, said conduits being connected to opposite sides of said valve, a movable member in said valve, means normally urging the movable member in said valve in engagement with the locking pin to normally maintain said movable member in a first position so as to establish communication between said conduits whereby a negative pressure is present in the first chamber equal to the negative pressure in the second chamber, means operable automatically upon said initial imprint being made on the saleslip to move the locking pin and the movable member to a second position to prevent communication between said conduits, said valve having means to admit atmosphere to the conduit connected to the first chamber and, thus, to the first chamber when the movable member is in said second position to thereby activate said braking system, and said locking pin being movable automatically in the opposite direction upon the second imprint being made on the saleslip for returning the movable member to its original position to again effect communication between the conduits and the first and second chambers to de-activate said braking system.

References Cited in the file of this patent

UNITED STATES PATENTS

| | | |
|---|---|---|
| 1,801,749 | McEachern | Apr. 21, 1931 |
| 1,884,673 | Hayes | Oct. 25, 1932 |
| 2,143,516 | Hazard | Jan. 10, 1939 |
| 2,353,755 | Price | July 18, 1944 |